(12) United States Patent
Lee

(10) Patent No.: US 7,954,400 B2
(45) Date of Patent: Jun. 7, 2011

(54) CAGE PEDAL

(76) Inventor: Joseph Lee, Taichung (TW)

( * ) Notice: Subject to any disclaimer, the term of this patent is extended or adjusted under 35 U.S.C. 154(b) by 113 days.

(21) Appl. No.: 12/461,886

(22) Filed: Aug. 27, 2009

(65) Prior Publication Data

US 2011/0048165 A1    Mar. 3, 2011

(51) Int. Cl.
*B62M 3/08* (2006.01)
(52) U.S. Cl. ............................................. 74/594.4
(58) Field of Classification Search .............. 74/594.4, 74/594.6; 36/131, 132
See application file for complete search history.

(56) References Cited

U.S. PATENT DOCUMENTS

| 493,696 | A | * | 3/1893 | Ferguson | 74/594.6 |
|---|---|---|---|---|---|
| 2,603,104 | A | * | 7/1952 | Augustin | 74/594.6 |
| 4,458,910 | A | * | 7/1984 | Stillwagon | 280/291 |
| 4,732,404 | A | * | 3/1988 | Coetzee | 280/283 |
| 4,809,563 | A | * | 3/1989 | Loppnow | 74/594.6 |
| 5,456,138 | A | * | 10/1995 | Nutile et al. | 74/594.6 |

FOREIGN PATENT DOCUMENTS

JP          02185884 A  *  7/1990

* cited by examiner

*Primary Examiner* — Vicky A Johnson
(74) *Attorney, Agent, or Firm* — Bacon & Thomas, PLLC

(57) ABSTRACT

A cage pedal has a platform, a linking bar, a resilient device and a holding shaft. The linking bar is perpendicularly mounted on the platform and has a rotating shaft and a connecting seat protruding from the rotating shaft. The resilient device is set between the platform and the linking bar and has a first panel, a first spring, a second panel and a second spring. The first panel has a connecting end pivotally mounted on the connecting seat. The first spring has two abutting ends respectively abutting the first panel and the connecting seat. The second panel has a clamping end pivotally mounted on the platform. The second spring having two abutting ends respectively abutting the second panel and the platform. The holding shaft is mounted on the connecting end of the first panel corresponding to the platform.

12 Claims, 5 Drawing Sheets

CAGE PEDAL

BACKGROUND OF THE INVENTION

1. Field of the Invention

The present invention relates to a cage pedal, and more particularly to a cage pedal easily establishing a secure connection without specialist shoes.

2. Description of Related Art

A conventional pedal for a bicycle is rotatably mounted on a crank arm and comprises three broad categories for different uses and bicycles. A conventional pedal merely comprises a platform, then further enhancements include clipless pedals and cage pedals. The clipless pedal has a cleat mounted on corresponding shoes that selectively engage a clip of the pedal for secure connection. The cage pedals have an adjustable strap that is tightened against a shoe of a rider.

The clipless pedals allow a foot to be disconnected quickly and ensure stable connection for improved pedaling efficiency; however, may be difficult to disconnect during accidents so raise risk of injury. Cage pedals have to be adjusted and offer less stable connection so less improved pedaling efficiency over platform pedals and are harder to disconnect from during accidents, especially when over-tightened. Although offering greater improvement, clipless pedals are more greatly expensive than cage pedals and require special shoes so are applicable to dedicated cycling. Therefore, the casual cyclist is unable to attain the improved pedaling efficiency of clipless pedals without sacrificing practicality, style and expense.

To overcome the shortcomings, the present invention tends to provide an adjustable music cage pedal to mitigate or obviate the aforementioned problems.

SUMMARY OF THE INVENTION

The main objective of the invention is to provide a cage pedal easily establishing a secure connection without specialist shoes.

The cage pedal has a platform, a linking bar, a resilient device and a holding shaft. The linking bar is perpendicularly mounted on the platform and has a rotating shaft and a connecting seat protruding from the rotating shaft. The resilient device is set between the platform and the linking bar and has a first panel, a first spring, a second panel and a second spring. The first panel has a connecting end pivotally mounted on the connecting seat. The first spring has two abutting ends respectively abutting the first panel and the connecting seat. The second panel has a clamping end pivotally mounted on the platform. The second spring having two abutting ends respectively abutting the second panel and the platform. The holding shaft is mounted on the connecting end of the first panel corresponding to the platform.

Other objects, advantages and novel features of the invention will become more apparent from the following detailed description when taken in conjunction with the accompanying drawings.

DETAILED DESCRIPTION OF PREFERRED EMBODIMENT

Figure 1:
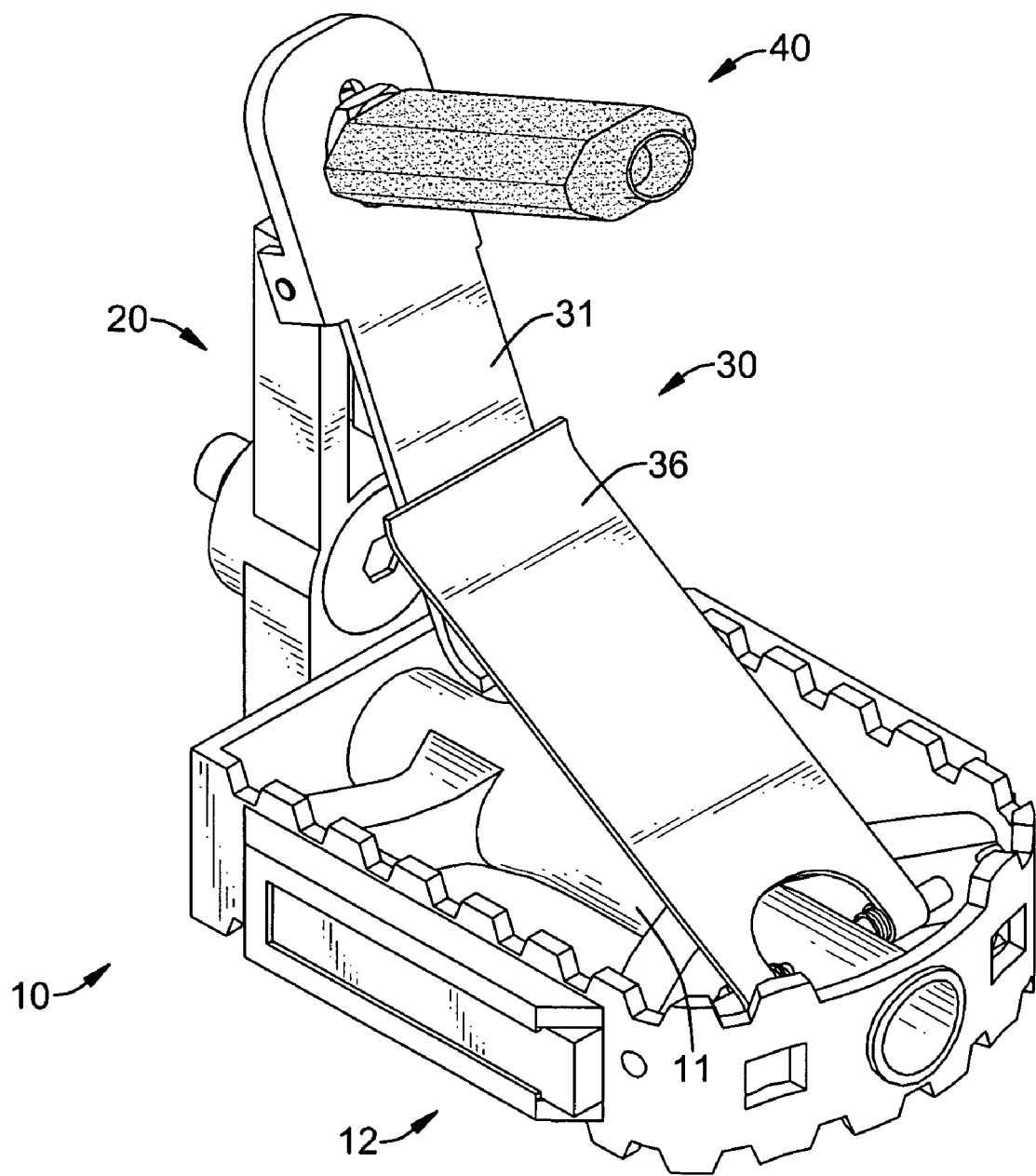
FIG. 1 is a perspective view of a cage pedal in accordance with the present invention.
Figure 2:
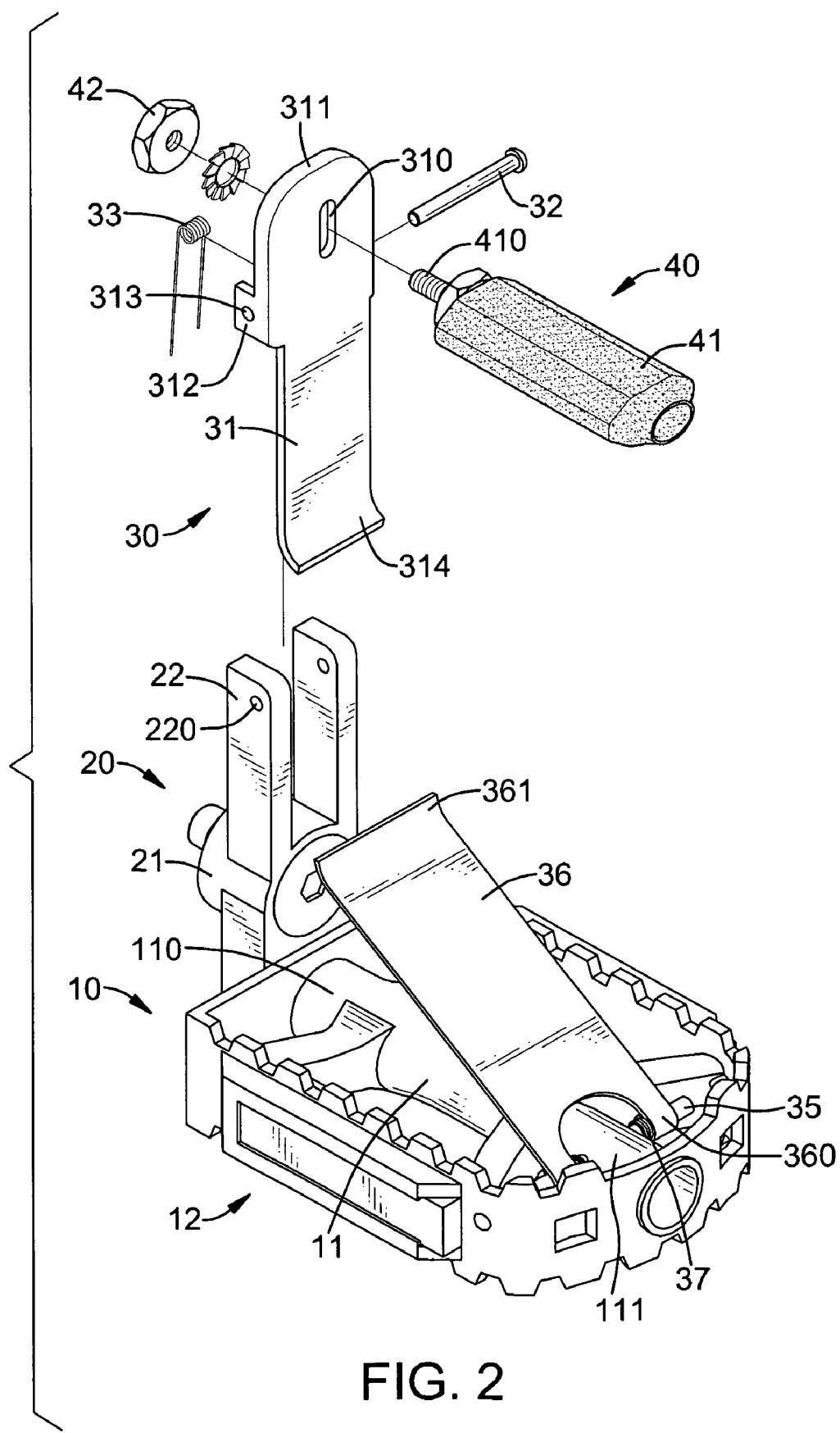
FIG. 2 is a partially exploded perspective view of the cage pedal in FIG. 1.

With reference to FIGS. 1 and 2, a cage pedal in accordance with the present invention is applied to a bicycle, including exercise, road and mountain bicycles, and has a platform (10), a linking bar (20), a resilient device (30) and a holding shaft (40).

The platform (10) may be rectangular in cross section, and has a frame (12) and a core (11). The frame (12) may be rectangular in cross section and has an inner side and a top. The top of the frame (12) may be toothed to enhance connection to a shoe of a rider. The core (11) may be a hollow rod, is mounted in the frame (12) and has a connecting end (110), a pivoting end (111) and multiple arms extending out from the core (11). The ends (110, 111) and the arms of the core (11) are respectively connected securely to the inner side of the frame (12). The connecting end (110) of the core (11) is mounted through and extends out of the frame (12).

The linking bar (20) is perpendicularly mounted on the platform (10) and has a mounting end, a rotating shaft (21) and a connecting seat (22). The mounting end of the linking bar (20) is mounted on the connecting end (110) of the core (11) of the frame (10). The rotating shaft (21) is rotatably mounted in and near the mounting end of the linking bar (20) to connect to a crank arm of the bicycle. The connecting seat (22) is opposite to the mounting end of the linking bar (20), may protrude upward from the rotating shaft (21) and has two connecting tabs each having a connecting hole formed through the connecting tab.

The resilient device (30) is mounted between the platform (10) and the linking bar (20), and has a first unit and a second unit respectively connected pivotally to the platform (10) and the linking bar (20).

The first unit has a first panel (31), a first pin (32) and a first spring (33). The first panel (31) is elongated and has a connecting end, a through hole (310), two parallel sides, a reinforced flange (311), two pivoting tabs (312), two pivoting holes (313) and a first curve end (314). The connecting end of the first panel (31) is pivotally mounted on the connecting seat (22). The through hole (310) is elongated and formed through the connecting end of the first panel (31). The reinforced flange (311) is U-shaped and is formed on and protrudes from the connecting end of the first panel (31) to enhance the structural strength of the connecting end of the first panel (31).

The pivoting tabs (312) are respectively formed on and protrude from the sides of the first panel (21), are mounted on the reinforced flange (311), are connected respectively to the connecting seat (22) of the linking bar (20), and each has a pivoting hole (313) formed through the pivoting tab (312) and aligned with the connecting hole (220) of a corresponding connecting seat (22). The first curve end (314) is opposite to the connecting end of the first panel (31) and shaped in a concave curve.

The first pin (32) is mounted through the pivoting holes (313) and the connecting holes (220) to connect the first panel (31) pivotally on the linking bar (20). The first spring (33) is mounted around the first pin (32) between the pivoting tabs (312) and the connecting tabs of the connecting seat (20) and has two abutting ends respectively abutting the first panel (31)

and the connecting seat (20) to provide a resilient force to keep the first panel (31) slanted relative to the platform (10).

The second unit has a second pin (35), a second panel (36), and a second spring (37). The second pin (35) is rotatably mounted through the pivoting end (111) of the core (11) and has two protruding ends extending out the core (11). The second panel (36) is elongated and has a clamping end, two clamping tabs (360) and a second curve end (361). The clamping tabs (360) protrude from the clamping end of the second panel (36) and respectively roll up and are mounted on the protruding ends of the second pin (35). The second curve end (361) is opposite to the clamping end of the second panel (36), is shaped in a concave curve and overlaps with the first curve end (314) of the first panel (31). The second spring (37) is mounted around the second pin (35) between the clamping tabs (360) and has two abutting ends respectively abutting the second panel (36) and the core (11) of the platform (10) to provide a resilient force to keep the second panel (36) slanted relative to the linking bar (20).

The holding shaft (40) is perpendicularly mounted on the connecting end of the first panel (31) at a side corresponding to the platform (10) and has a shaft platform (41) and a nut (42). The shaft platform (41) has a flat surface, a skid cover and a bolt (410). The flat surface of the shaft platform (41) faces the platform (10). The skid cover is mounted around and covers the shaft platform (41). The bolt (411) protrudes from the shaft platform (411) and is mounted through the through hole (310) of the first panel (31). The nut (42) is screwed with the bolt (410) to connect the holding shaft (40) on the first panel (31).

Figure 3:
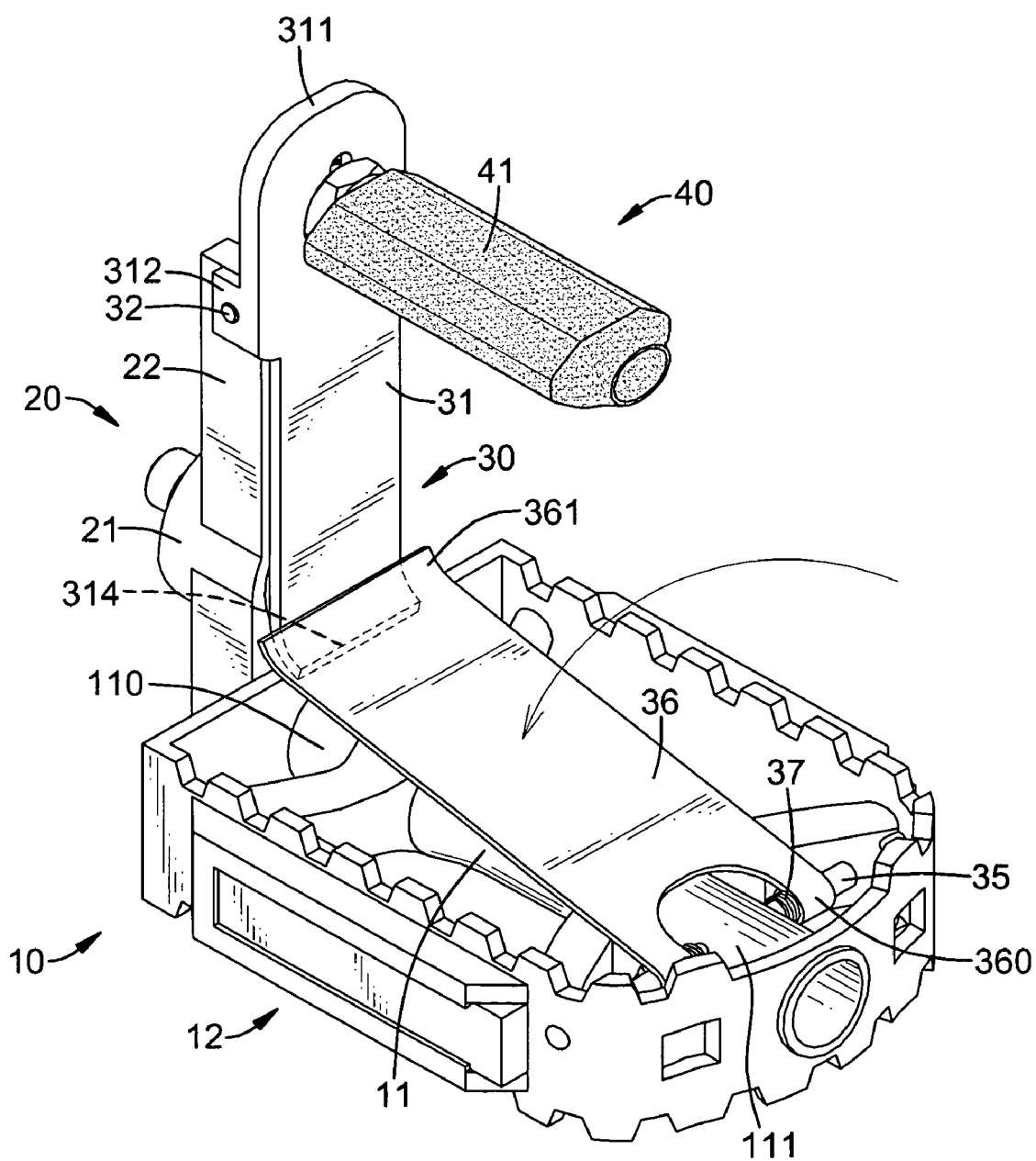
FIG. 3 is an operational perspective view of the cage pedal in FIG. 1.
Figure 4:
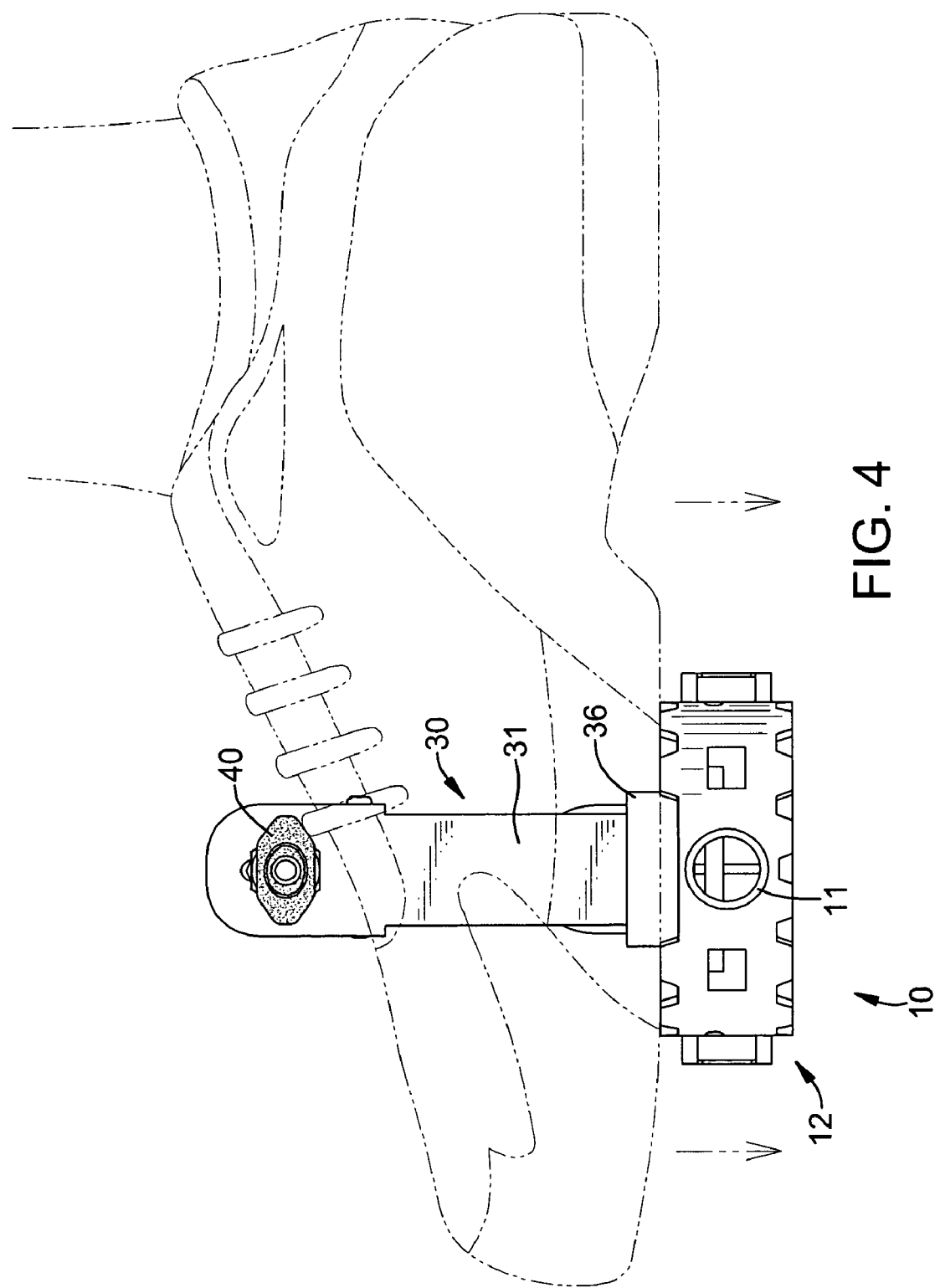
FIG. 4 is an operational side view of the cage pedal in FIG. 3.
Figure 5:
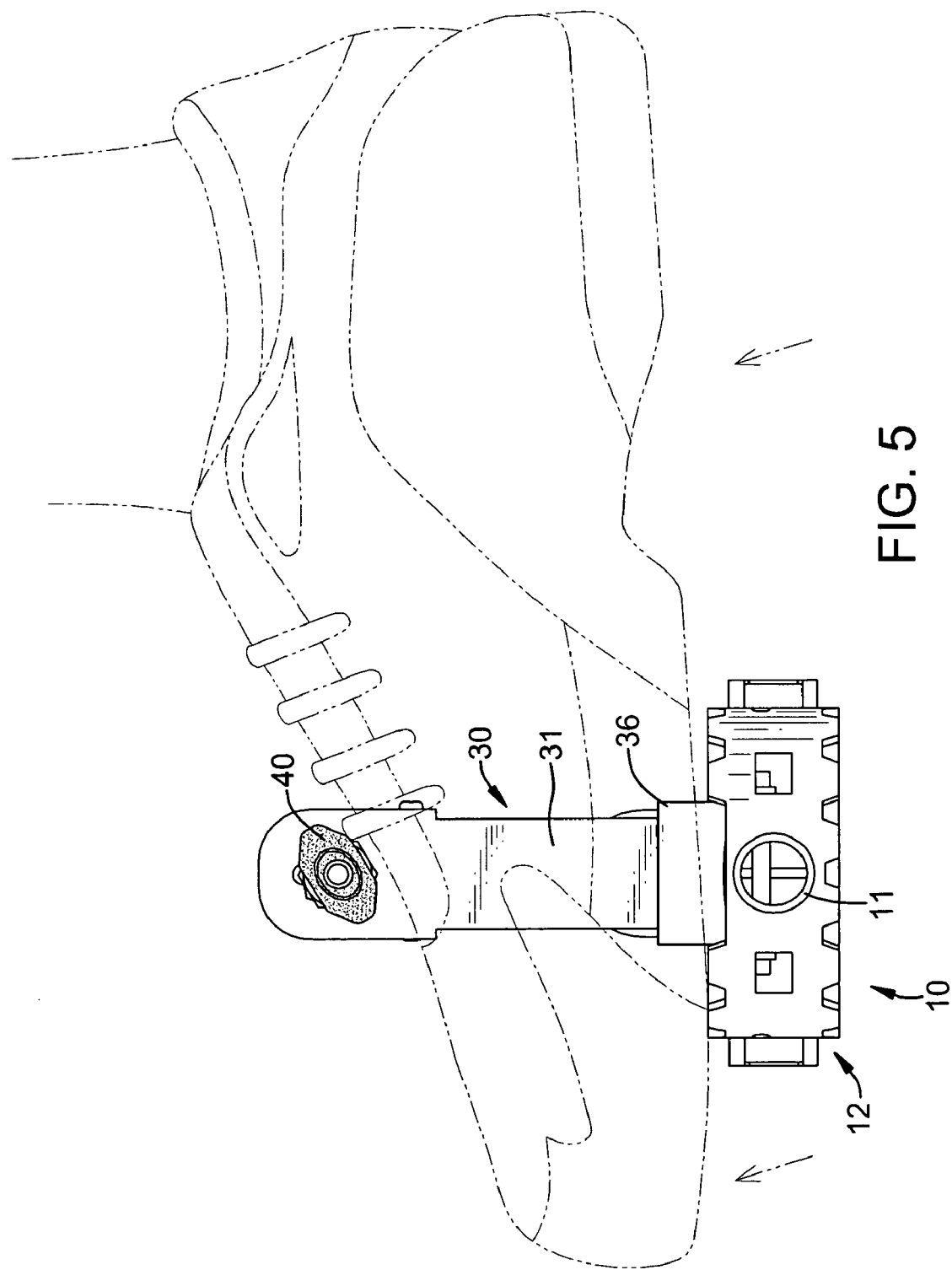
FIG. 5 is another operational side view of the cage pedal in FIG. 3.

With reference to FIGS. 3 to 5, in use, feet are placed in the cage pedal assemblies between the corresponding holding shafts (40) and the bodies (10) to pedal the cage pedal assemblies and drive the bicycle. The second panels (36) are respectively stepped down and pressed on the frames (12) of the bodies (10). The second curve end (361) of the second panels (36) are pressed and push the first panels (31) onto the linking bars (20). The second curve ends (361) of the second panels (36) respectively overlap the first curve ends of the first panels (31).

On a down-stroke, the sole of the foot steps on the platform (10). During an up-stroke, the cage pedal the instep of the foot abuts the holding shaft (40) to keep driving the bicycle. Because the cage pedal may provide forces downward and upward to drive the bicycle, the efficiency of operating and stepping the cage pedal is improved.

To remove feet from the cage pedal, the springs (33, 37) respectively provide a resilience to push the panels (31, 36) to slant and extend an opening defined between the platform (10) and the holding shaft (40) to allow the feet to disengage the cage pedal assemblies easily and prevent the feet remaining locked in the cage pedal so causing an accident or injury.

Furthermore, because the first curve end (314) and the second curve end (361) are respectively shaped in concave curves, the panels (31, 32) will not lock to each other even when the panels (31, 36) are pressed to cause the first curve end (314) and the second curve end (361) to overlap.

Consequently, the cage pedal allows the feet to be easily locked in for improving pedaling efficiency without requiring specialized shoes and retaining a safety of use of clipless systems.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:
1. A cage pedal comprising:
a platform;
a linking bar perpendicularly mounted on the platform and having
   a rotating shaft rotatably mounted in the linking bar;
   a connecting seat protruding from the rotating shaft; and
a resilient device mounted between the platform and the linking bar and having
   a first panel having a connecting end pivotally connected to the connecting seat;
   a first spring having two abutting ends respectively butting the first panel and the connecting seat to provide a resilient force to keep the first panel slanted relative to the platform;
   a second panel having a clamping end pivotally connected to the platform; and
   a second spring having two abutting ends respectively abutting the second panel and the platform to provide a resilient force to keep the second panel slanted relative to the linking bar; and
a holding shaft mounted on the connecting end of the first panel at a side corresponding to the platform.
2. The cage pedal as claimed in claim 1, wherein
the second panel further has a second curve end opposite to the clamping end, shaped in a concave curve and overlapped with the first panel.
3. The cage pedal as claimed in claim 1, wherein
the first panel further has a first curve end opposite to the connecting end, shaped in a concave curve and overlapped with the second panel.
4. The cage pedal as claimed in claim 1, wherein
the second panel further has a second curve end opposite to the clamping end, shaped in a concave curve; and
the first panel further has a first curve end opposite to the connecting end, shaped in a concave curve and overlapped with the second curve end of the second panel.
5. The cage pedal as claimed in claim 4, wherein
the first panel further has a reinforced flange formed on and protruding from the connecting end of the first panel.
6. The cage pedal as claimed in claim 5, wherein
the linking bar further has a connecting hole formed through the connecting seat;
the first panel further has
   two parallel sides; and
   two pivoting tabs respectively formed on the parallel sides and mounted on the connecting seat, and each having a pivoting hole aligned with the connecting hole of the connecting seat; and
the resilient device further has a first pin mounted through the connecting hole of the connecting seat and the pivoting hole of the first panel.
7. The cage pedal as claimed in claim 6, wherein
the platform further has a core having a pivoting end being opposite to the linking bar;
the resilient device further has a second pin rotatably and perpendicularly mounted through the pivoting end of the core and having two protruding ends extending out the core; and
the second panel further has two clamping tabs protruding from the clamping end of the second panel and respectively rolling up and mounted on the protruding ends of the second pin.

8. The cage pedal as claimed in claim 7, wherein
the first panel further has a through hole formed through the connecting end of the first panel; and
the holding shaft further has
a shaft platform having a bolt mounted through the through hole of the first panel; and
a nut screwed on the bolt to connect the holding shaft and the first panel.

9. The cage pedal as claimed in claim 1, wherein
the first panel further has a reinforced flange formed on and protruding from the connecting end of the first panel.

10. The cage pedal as claimed in claim 1, wherein
the linking bar further has a connecting hole formed through the connecting seat;
the first panel further has
two parallel sides; and
two pivoting tabs respectively formed on the parallel sides and mounted on the connecting seat, and each having a pivoting hole aligned with the connecting hole of the connecting seat; and
the resilient device further has a first pin mounted through the connecting hole of the connecting seat and the pivoting holes of the first panel.

11. The cage pedal as claimed in claim 1, wherein
the platform further has a core having a pivoting end being opposite to the linking bar;
the resilient device further has a second pin rotatably and perpendicularly mounted through the pivoting end of the core and having two protruding ends extending out of the core; and
the second panel further has two clamping tabs protruding from the clamping end of the second panel and respectively rolling up and mounted on the protruding ends of the second pin.

12. The cage pedal as claimed in claim 1, wherein
the first panel further has a through hole formed through the connecting end of the first panel; and
the holding shaft further has
a shaft platform having a bolt mounted through the through hole of the first panel; and
a nut screwed on the bolt to connect the holding shaft and the first panel.

* * * * *